Patented May 21, 1940

2,201,884

UNITED STATES PATENT OFFICE

2,201,884

POLYMERIC MATERIAL

Wallace Hume Carothers, deceased, late of Wilmington, Del., by Wilmington Trust Company, executor, Wilmington, Del., assignor to E. I. du Pont de Nemours & Company, Wilmington, Del., a corporation of Delaware No Drawing. Application November 5, 1937, Serial No. 173,048

7 Claims. (Cl. 260—607)

This invention relates to new polymeric materials, and more particularly to polymeric sulfones and the process of preparing them.

This invention has as its object the preparation of high molecular weight polymeric sulfones. A further object is to provide a method for making available hitherto inaccessible polymeric sulfones. A still further object is to make alkali-resistant polymeric sulfones. Further objects will appear hereinafter.

These objects are accomplished, as will more fully appear hereinafter, by a process which comprises oxidizing a polymeric sulfide.

Polymeric sulfides, from which the polymeric sulfones are made according to the process of this invention, may be obtained by several known methods. Without making any assumption as to their structure, they may, as a statement of fact, be represented by the general formula $(RSR'S)_n$, wherein R and R', which may be identical or different, represent any chain of carbon atoms of whatever length or character.

In accordance with this invention it has been found that polymeric sulfides can be readily oxidized to new polymeric materials, whose composition is that of a polymeric sulfone, $(RSO_2R'SO_2)_n$, and whose molecular weights are comparable to or higher than those of the original polymeric sulfides.

No polymeric sulfones have, as far as is now known, ever been obtained by the process outlined above. There is, however, a fairly large body of journal and patent literature on polymeric sulfones prepared by addition of sulfur dioxide to unsaturates (olefins, diolefins or acetylenes). For a review of the art, see Frederick, Cogan and Marvel, J. Am. Chem. Soc. 56, 1815 (1934). It is obvious that, in such polymeric sulfones, the hydrocarbon chains separating two sulfone groups can consist only of either two carbon atoms (with olefins or acetylenes) or four carbon atoms (with diolefins, assuming that the addition takes place in the 1,4 positions). These polymeric sulfones may therefore be represented by the respective formulas, $(-C-C-SO_2-)_n$ and $(-C-C-C-C-SO_2-)_n$, where the substituents on the carbon atoms are omitted for simplification. In the polymeric sulfones described herein, on the other hand, the carbon chain between two sulfone groups may be of any length or character whatever, and are not limited as in the prior practise to those cases where the carbon chain consists of two or four carbon atoms. It will be apparent, then, that the difference between the new products as a whole and the $SO_2$— unsaturate addition products is not merely a matter of going from one compound to its higher homologs or analogs. It is a fundamental difference due to the fact that the $SO_2$ addition process is inherently limited to the preparation of polymeric sulfones in which the sulfone groups are separated by two (or sometimes four) carbon atoms.

Although the process of oxidizing a monomeric sulfide R—S—R' to the corresponding monomeric sulfone R—$SO_2$—R' is well known, it was, however, not at all obvious or even expected that the process would be successful when extended to a polymeric sulfide. On the contrary, it might have been expected that either no reaction would take place because of the difficulty of bringing a polymeric material into intimate contact with an oxidizing agent, or else that the oxidation would be attended by considerable degradation, due to the rupture of numerous carbon to carbon bonds, or even complete breaking down of the polymeric molecule. But contrary to these expectations the present new process yields homogeneous polymeric sulfones, whose molecular weights (as indicated by viscosity measurements) are at least as high as those of the original polymeric sulfides.

The polymeric sulfides, from which the new polymeric sulfones are prepared, are made by known procedures. Of the two principal methods which lead to high molecular weight polymeric sulfides one is the reaction between α,ω-dihalides and alkali sulfides, (see, for example, Von Braun, Ber. 43, 547, 3220 (1910); Grichkevitch-Trokhimovski, Bull. Soc. Chem. 24, 540 (1918)). This reaction is represented by the equation:

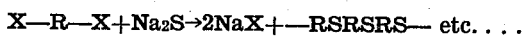

The other method is the reaction between α,ω-dihalides and α,ω-dimercaptans in the form of their alkali mercaptides (see, for example, Kötz and Sevin, J. f. prakt. ch. (2), 64, 518 (1901); Tucker and Reid, J. Am. Chem. Soc. 55, 775 (1933); Meadow and Reid, ibid., 56, 2177 (1934)). This reaction is illustrated by the equation:

The second method usually gives polymers having a higher molecular weight than the first. It seems clearly established that these polymeric sulfides are linear polymers consisting of regularly repeating units,

etc., where R and R', the hydrocarbon chains separating the sulfide groups, are necessarily identical if the first method of preparation is used and may be either identical or different if the second method is used. The polymeric sulfides, after recrystallization from an appropriate solvent, are obtained as colorless and odorless solids whose melting point is dependent on the nature and length of the hydrocarbon chain separating the sulfur atoms.

The oxidation of the polymeric sulfides to polymeric sulfones in accordance with the practise of this invention is best shown by the following illustrative examples.

Example I

Fifteen (15) parts of polymeric hexamethylene sulfide (obtained by reacting hexamethylene dibromite with sodium sulfide or the sodium derivative of hexamethylene dimercaptan) are dissolved in a boiling mixture of 350 parts of acetone, 350 parts of benzene, and 15 parts af acetic acid. To the stirred and refluxed solution is added in small portions 35 parts of solid potassium permanganate and 30 parts of water, after which the mixture is stirred and refluxed for two to five hours. After cooling, the black solid material is separated by filtration, suspended in water and treated with sulfur dioxide until all the manganese dioxide is dissolved. The residual insoluble white material (crude polymeric sulfone) is washed with water, extracted with hot benzene to remove traces of unoxidized polymeric sulfide and dried at 100° C. The yield of polymeric sulfone is 90% of the theory. If desired, the product may be purified by dissolving it in hot m-cresol and filtering the hot solution into acetone which precipitates the polymeric sulfone. This purification is in general unnecessary.

Polymeric hexamethylene sulfone is a white solid melting at about 196–198° C. Its composition corresponds to $((CH_2)_6SO_2)_n$: S in per cent: calculated, 21.62; found, 21.32. The polymeric sulfone is insoluble in water and the common organic solvents (acetone, alcohol, ether, butyl ether, dioxane, acetic acid, butyl acetate, acetonitrile, chloroform, carbon tetrachloride, trichlorethylene, benzene, toluene, chlorobenzene, camphor); it is soluble in phenol, m-cresol, xylenol, nitrobenzene, and o-hydroxydiphenyl at elevated temperature, and sparingly soluble in hot formic acid. It also dissolves in warm concentrated sulfuric acid from which it can be recovered, apparently unaltered, by dilution. It is unaffected by boiling concentrated hydrochloric acid; prolonged heating with 10% potassium hydroxide, either aqueous or alcoholic, leaves it entirely undissolved and unchanged except for a slight darkening. It melts to a viscous liquid which can be extruded under pressure to long filaments. The insolubility of polymeric hexamethylene sulfone precludes molecular weight determination by conventional methods; comparison of the viscosity of m-cresol solutions with solutions of the original polymeric sulfide in the same solvent shows, however, that there is no degradation of the polymeric chain when the oxidation is carried out as indicated above.

Example II

Ten (10) parts of polymeric hexamethylene sulfide is dissolved in 175 parts of hot benzene. The solution is vigorously stirred with 275 parts of 10% sulfuric acid. To the refluxing mixture is added in small portions a hot solution of 20 parts of potassium permanganate in 200 parts of water. At the end of the very vigorous reaction the mixture is stirred and heated for one-half hour, then filtered. The solid mixture is treated as in Example I. The yield of polymeric sulfone is 87%. Viscosity measurements show that the molecular weight is considerably lower than that of the original polymeric sulfide, although the melting point and solubilities of the product are substantially identical with those of the polymeric sulfone of Example I. It is thus possible, by oxidizing under more vigorous conditions, to control in a measure the molecular weight of the desired product.

Example III

Ten (10) parts of polymeric tetradecamethylene sulfide (from tetradecamethylene dibromide and sodium tetradecamethylene dimercaptide) is dissolved in a boiling mixture of 235 parts of acetone and 400 parts of benzene. To this is added 15 parts of acetic acid, then gradually, with stirring and refluxing, 12 parts of solid potassium permanganate and 40 parts of water, after which the mixture is refluxed three hours and treated as in Example I. The yield of polymeric tetradecamethylene sulfone is 90%. It melts at 166–168° C. and shows the same solubilities as polymeric hexamethylene sulfone and the same good resistance to hydrolyzing agents. Its viscosity in m-cresol solution is higher than that of the original polymeric sulfide, indicating that the oxidation may have been accomplished by further polymerization.

The above polymeric sulfones are saturated, as is necessarily the case with any polymeric sulfone produced by the oxidation process of this invention which would rupture any double bonds present in the original polymeric sulfide.

This invention is applicable in general to the production of polymeric sulfones from various polymeric sulfides other than those used in the above examples. In the polymeric sulfides,

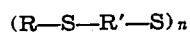

$$(R—S—R'—S)_n$$

which constitute the starting materials, R and R' may be any divalent organic radical. The preferred products are those in which either R or R' is a hydrocarbon radical and contains more than four carbon atoms in the chain separating the S atoms to which it is attached. As already indicated R and R' may be identical or different. As additional examples of polymeric sulfides capable of being oxidized to polymeric sulfones may be mentioned the following: ethylene, trimethylene, pentamethylene, octamethylene, decamethylene, hexadecamethylene, p-xylylene, and p,p'-diphenyl. Mixed polymeric sulfides may be used in which R and R' are different as, for instance, ethylene-hexamethylene, ethylene-decamethylene, ethylene-p-xylylene, trimethylene-hexamethylene, hexamethylene-p-xylylene, hexamethylene-m-phenylene, m-phenylene-p-xylylene, methylethylene-hexamethylene, and phenylethylene-hexamethylene.

The oxidation process described in the above examples may be modified in a variety of ways. For example, any solvent or combination of solvents which will dissolve the polymeric sulfide and potassium permanganate (even though sparingly) may be used in place of benzene and acetone. The medium may even be a non-solvent: for example, addition of permanganate to a suspension of polymeric hexamethylene sulfide in water, with or without an emulsifying agent, causes rapid oxidation. Other oxidizing agents may be used in the process of this invention, suitable examples being hydrogen peroxide, chromic acid, and nitric acid. The experimental conditions may be varied widely. Generally it is desirable to select mild oxidation conditions, since this leads to a higher molecular weight product than the use of more vigorous conditions. Temperatures ranging from 0 to 100° C. are usually the most suitable.

This invention is also applicable to the preparation of mixed polymeric sulfides-sulfones. These products may be made by using less oxidizing agent than is required to oxidize all the sulfide groups to sulfone groups.

It has been mentioned before that the only known way of obtaining polymeric sulfones consists in adding sulfur dioxide to unsaturates. This method has the obvious disadvantage that the products so obtained are limited to one or at most two general types, in which the chain separating two sulfone groups contains either two or four carbon atoms. With the present process, on the other hand, there are no such limitations: any $\alpha,\omega$-dihalide of whatever structure may be converted into a polymeric sulfide and this oxidized to the corresponding polymeric sulfone. In other words, a whole class of hitherto unobtainable compounds is made available. The polymeric sulfones obtained by the present process are in general not resinous in character, but solids with rather sharp melting points and showing sub-microcrystallinity. The polymeric sulfones invariably melt very much higher than the original polymeric sulfides and are much less sensitive to organic solvents.

The new polymeric sulfones in which the hydrocarbon chain between two sulfone groups comprises at least five carbon atoms are particularly advantageous as compared to the sulfones previously made in that the new polymeric sulfones are substantially unaffected by prolonged contact with alkalies or acids. This property, on the other hand, is generally lacking in the sulfur dioxide-olefin addition products inasmuch as these sulfones are rapidly hydrolyzed by alkalies.

The polymeric sulfones described herein are useful ingredients in coating compositions. Those of higher molecular weight are also useful in making fibers, bristles, ribbons, films, etc. Other applications include, for example, use in molding compositions. In these various applications the sulfones may be used alone or in admixture with each other or with other materials, e. g., resins, plasticizers, pigments, dyes, oils, etc.

As many apparently widely different embodiments of this invention may be made without departing from the spirit and scope thereof, it is to be understood that this invention is not limited to the specific embodiments thereof except as defined in the appended claims.

What is claimed is:

1. In a process of preparing polymeric sulfones, the step which comprises oxidizing polymeric sulfides.

2. In the process set forth in claim 1 wherein the sulfide groups in the polymeric sulfides are separated by hydrocarbon radicals, at least one of said radicals having a chain of at least five carbon atoms separating the sulfide groups.

3. In a process of preparing polymeric sulfones, the step which comprises oxidizing a polymeric sulfide in the presence of a diluent.

4. A process which comprises reacting with agitation a polymeric sulfide in the presence of an oxidizing agent, and continuing said agitation until a polymeric sulfone is formed.

5. Linear polymeric saturated sulfones which are fusible and soluble in meta-cresol and in which the sulfone groups are separated by hydrocarbon radicals, at least one of said hydrocarbon radicals having a chain of at least five carbon atoms separating the sulfone groups.

6. Polymeric hexamethylene sulfone.

7. A polymeric saturated sulfone having recurring structural units of formula —RSO$_2$R'SO$_2$— wherein R and R' represent divalent hydrocarbon radicals at least one of which has a chain of at least five carbon atoms separating the sulfone groups.

WALLACE HUME CAROTHERS,
By ELWYN EVANS,
*For Wilmington Trust Company Executor of the Estate of Wallace Hume Carothers, Deceased.*